United States Patent
Amsterdam et al.

(10) Patent No.: US 8,326,442 B2
(45) Date of Patent: Dec. 4, 2012

(54) CONSTRAINED NAVIGATION IN A THREE-DIMENSIONAL (3D) VIRTUAL ARENA

(75) Inventors: Jeffrey D. Amsterdam, Marietta, GA (US); Edward P. Curry, Atlanta, GA (US)

(73) Assignee: International Business Machines Corporation, Armonk, NY (US)

( * ) Notice: Subject to any disclaimer, the term of this patent is extended or adjusted under 35 U.S.C. 154(b) by 1055 days.

(21) Appl. No.: 11/753,726

(22) Filed: May 25, 2007

(65) Prior Publication Data

US 2008/0294299 A1    Nov. 27, 2008

(51) Int. Cl.
*G05B 19/18* (2006.01)

(52) U.S. Cl. ............... 700/56; 700/59; 700/86; 700/87; 700/251

(58) Field of Classification Search .............. 700/56, 700/59, 86, 87, 251; 715/850, 852, 716, 715/764, 757; 345/418, 473, 419, 421, 158; 463/32; 434/156, 157, 185
See application file for complete search history.

(56) References Cited

U.S. PATENT DOCUMENTS

| | | | | |
|---|---|---|---|---|
| 4,862,373 A * | 8/1989 | Meng | ............... | 700/255 |
| 5,841,439 A * | 11/1998 | Pose et al. | ............ | 345/418 |
| 5,872,575 A * | 2/1999 | Segal | ............... | 345/473 |
| 6,097,393 A * | 8/2000 | Prouty et al. | ............ | 345/419 |
| 6,204,850 B1 * | 3/2001 | Green | ............... | 715/850 |
| 6,222,557 B1 | 4/2001 | Pulley, IV et al. | | |
| 6,271,843 B1 * | 8/2001 | Lection et al. | ............ | 715/848 |
| 6,346,938 B1 * | 2/2002 | Chan et al. | ............ | 345/419 |
| 6,363,161 B2 * | 3/2002 | Laumeyer et al. | ............ | 382/104 |
| 6,400,996 B1 * | 6/2002 | Hoffberg et al. | ............ | 700/83 |
| 6,429,863 B1 * | 8/2002 | LoPiccolo et al. | ............ | 345/419 |
| 6,556,206 B1 * | 4/2003 | Benson et al. | ............ | 345/473 |
| 6,907,579 B2 * | 6/2005 | Chang | ............ | 715/850 |
| 7,187,377 B1 * | 3/2007 | Pella et al. | ............ | 345/419 |
| 7,199,793 B2 * | 4/2007 | Oh et al. | ............ | 345/419 |
| 7,239,311 B2 * | 7/2007 | Dunn et al. | ............ | 345/419 |
| 7,564,455 B2 * | 7/2009 | Gatewood et al. | ............ | 345/419 |
| 7,583,275 B2 * | 9/2009 | Neumann et al. | ............ | 345/633 |
| 2003/0052875 A1 * | 3/2003 | Salomie | ............ | 345/419 |
| 2004/0085335 A1 * | 5/2004 | Burlnyk et al. | ............ | 345/716 |
| 2005/0004723 A1 * | 1/2005 | Duggan et al. | ............ | 701/24 |
| 2005/0075167 A1 * | 4/2005 | Beaulieu et al. | ............ | 463/32 |

(Continued)

OTHER PUBLICATIONS

Badler, N.L., Manoochehri, K.H., and Baraff, D., "Multi-Dimensional Input Techniques and Articulated Figure Positioning by Multiple Constaints", Oct. 1986, Interactive 3D Graphics, pp. 151-169.*

(Continued)

*Primary Examiner* — Mohammad Ali
*Assistant Examiner* — Kelvin Booker
(74) *Attorney, Agent, or Firm* — Anna L. Linne; Hoffman Warnick LLC

(57) ABSTRACT

This disclosure describes a method for camera/user view navigation about enclosed 3D environment (e.g., the inside of a sports stadium or arena). The navigation system constrains the user view (camera) to a (pre-defined) guide based on the shape and size of the interior area which is the focus of the 3D virtual world. In the case of an arena this would generally be the playing surface. The user can easily control the camera movement on this guide with traditional up/down and left/right controls. These controls could be implemented as buttons within the application, keyboard controls, or mouse controls.

22 Claims, 4 Drawing Sheets

U.S. PATENT DOCUMENTS

| | | | |
|---|---|---|---|
| 2007/0005795 A1 | 1/2007 | Gonzalez | |
| 2007/0070069 A1 | 3/2007 | Samarasekera et al. | |
| 2007/0103464 A1 | 5/2007 | Kaufman et al. | |
| 2009/0326893 A1* | 12/2009 | Neely | 703/8 |
| 2010/0214313 A1* | 8/2010 | Herman et al. | 345/593 |
| 2010/0261526 A1* | 10/2010 | Anderson et al. | 463/31 |

OTHER PUBLICATIONS

Barr, A.H., Currin, B., Gabriel, S., Hughes, J.F., and Design, S., "Smooth Interpolation of Orientations with Angular Velocity Constraints using Quaternions", 1992, California Institute of Technology.*

Drucker, S.M. and Zeltzer, D., "Intelligent Camera Control in a Virtual Environment", 1994, In Proceedings of Graphics Interface '94.*

Drucker, S.M., Galyean, T.A., and Zeltzer, D., "Cinema: A System for Procedural Camera Movements", Computer Graphics and Animation Group—MIT Labs, 1992.*

Hanson, A., "Quaternion Gauss Maps and Optimal Framings of Curves and Surfaces", Oct. 1998, Department of Computer Science—Indiana University, pp. 1-62.*

Hanson, A., "Rotations for N-Dimensional Graphics", 1995, Academic Press, Graphics Gems V, pp. 55-64.*

Mackinlay, J.D., Card, S.K., and Robertson, G.G., "Rapid Controlled Movement Through a Virtual 3D Workspace", Aug. 1990, Computer Graphics, vol. 24, No. 4, pp. 171-176.*

Meng, X., and Hu, Z., "A New Easy Camera Calibration Technique Based on Circular Points", 2003, Pattern Recognition, No. 36, pp. 1155-1164.*

Song, D. and Norman, M., "Non-Linear Interactive Motion Control Techniques for Virtual Space Navigation", Sep. 1992, IEEE Virtual Reality Annual International Symposium (VRAIS), pp. 111-117.*

Stella, E. And Distante, A., "Self-Location of a Mobile Robot by Estimation of Camera Parameters", Feb. 1995, Robotics and Autonomous Systems, No. 15, pp. 179-187.*

Sun, T., "Conics-Enhanced Vision Approach for Easy and Low-Cost 3D Tracking", Jan. 2004, Pattern Recognition—The Journal of the Pattern Recognition Society, pp. 1441-1450.*

Tan, D.S., Robertson, G.G. and Czerwinski, M., "Exploring 3D Navigation: Combining Speed-Coupled Flying with Orbiting", 2001, Microsoft Research, pp. 418-425.*

Yoon, N. and Lee, B., "Viewpoint Interpolation Using an Ellipsoid Head Model for Video Teleconferencing", 2005, USVS, LNCS 3804, pp. 287-293.*

Yuen, H.K., Illingworth, J., and Kittler, J., "Detecting Partially Occluded Ellipses Using the Hough Transform", Feb 1989, Image and Vision Computing, vol. 7, Iss 1, pp. 31-37.*

Ying, X., Hongbin, Z., "Simultaneously Calibrating Catadioptric Camera and Detecting Line Features Using Hough Transform", Aug. 2005, IROS 2005.*

Vincze, M., Ayromlou, M., Ponweiser, W., and Zillich, M., "Edge-Projected Integration of Image and Model Cues for Robust Model-Based Object Tracking", 2001, The Intl Journal of Robotics Research.*

Ser, P.K., and Siu, W.C., "Novel Detection of Conics Using 2-D Hough Planes", Oct. 1995, IEE Proc-Vis Image Signal Process, vol. 142, No. 5.*

Ihrke, I., Ahrenberg, L. and Magnor, M., "External Camera Calibration for Synchronized Multi-Video Systems", Jan. 2004, Journal of WSCG, No. 12, pp. 537-544.*

Ahmed, A. and Eades, P., "Automatic Camera Path Generation for Graph Navigation in 3D", 2005, APVIS 2005, Asia Pacific Symposium on Information Visualisation, Sydney Australia, Conferences in Research and Practice in Information Technology, vol. 45.*

Barron, J.L. and Thacker, N. A., "Tutorial: Computing 2D and 3D Optical Flow", Jan. 2005, TINA Memo No. 2004-012, Imaging Science and Biomedical Engineering Division, Medical School, University of Manchester, Obtained online at "www.tinavision.net".*

Burtnyk, N.; Khan, A.; Fitzmaurice, G.; Balakrishnan, R. and Kurtenbach, G., "StyleCam: Interactive Stylized 3D Navigation Using Integrated Spatial and Temporal Controls", Oct. 2002, 2002 Symposium on User Interface Software and Technology (UIST), Paris, France.*

Christie, M. and Hosobe, H., "Through-the-Lens Cinematography", Spring 2006, Lecture Notes in Computer Science, vol. 4073, pp. 147-159.*

Durand, F., "An Invitation to Discuss Computer Depiction", 2002, Laboratory for Computer Science, MIT, Association for Computing Machinery, Inc.*

Hanson, A.J.; Wernert, E.A. And Hughes, S.B., "Constrained Navigation Environments", Jun. 1997, 1997 Scientific Visualization Conference, Dagstuhl, Germany, ISBN: 0-7695-0503-1.*

Hanson, A.J. and Wernert, E., "Constrained 3D Navigation with 2D Controllers", 1997 Proceedings of Visualization, pp. 175-182, Society Press.*

Lomas, D.J. and Graves, M.J., "Reference Surface Constrained Navigation Controller for 3D Image Data and Real-Time MRI", 2007, Proceedings of the Intl. Society for Magnetic Resonance in Medicine, vol. 15.*

Ropinski, T.; Steinicke, F. and Hinrichs, K., "A Constrained Road-Based VR Navigation Technique for Travelling in 3D City Models", Dec. 2005, Intl. Conference on Augmented Tele-Existence, Christchurch, New Zealand.*

Vincze, M., "Robust Tracking of Ellipses at Frame Rate", 2001, Pattern Recognition, vol. 34, pp. 487-498.*

Vincze, M.; Ayromlou, M. and Kubinger, W., "An Integrated Framework for Robust Real-Time 3D Object Tracking", 1999, Lecture Notes in Computer Science, vol. 1542/1999, pp. 135-150.*

Zillich, M.; Legenstein, D.; Ayromlou, M. and Vincze, M., "Robust Object Tracking for Robot Manipulation and Navigation", 2000, Intl. Archives of Photogrammetry and Remote Sensing, vol. 33, Part B5, Amsterdam.*

Hanson et al., "Constrained 3D Navigation with 2D Controllers," IEEE Computer Society Press, Proceedings of Visualization, 1997, pp. 175-182.

Hanson et al., "Constrained Navigation Environments," IEEE Scientific Visualization Conference, 1997, pp. 1-11.

Ropinski et al., "A Constrained Road-Based VR Navigation Technique for Travelling in 3D City Models," ACM International Conference Proceeding Series, vol. 157, Proceedings of the 2005 International Conference on Augmented Tele-Existence, 2005, pp. 228-235.

* cited by examiner

CONSTRAINED NAVIGATION IN A THREE-DIMENSIONAL (3D) VIRTUAL ARENA

FIELD OF THE INVENTION

The present invention generally relates to user navigation in a 3D virtual arena. Specifically, the present invention provides constrained navigation in the 3D virtual arena based on creation of a guide.

BACKGROUND OF THE INVENTION

User navigation within 3D virtual environments is inherently difficult and confusing for average users. In a 3D environment a user can typically move in one of six directions. These are generally considered to be forward/backward, up/down, left/right (translation in three perpendicular axes) combined with rotation about three perpendicular axes (yaw, pitch, and roll), known as the six degrees of freedom. Controlling movement in six directions with a keyboard and/or mouse is difficult because these are essentially 2D devices. To accomplish movement in a 3D environment with 2D devices developers usually resort to a combination of key and/or mouse clicks and movement. Easily explaining this navigation to inexperienced users is difficult, and is made more so by the fact that no standard exists and different applications use different control setups. In addition to difficult user controls, allowing full six degrees of freedom navigation presents the developer with the additional requirement. Physical boundaries within the 3D world must be accounted for and users prevented from violating these boundaries.

SUMMARY OF THE INVENTION

In general, this disclosure describes a method for navigation (of a camera) that solves many of these issues for an enclosed 3D environment (e.g., the inside of a sports stadium or arena). The navigation system created constrains the user view (camera) to a (pre-defined) guide based on the shape and size of the interior area which is the focus of the 3D virtual world. In the case of an arena this would generally be the playing surface. The user can easily control the camera movement on this guide with traditional up/down and left/right controls. These controls could be implemented as buttons within the application, keyboard controls, or mouse controls.

A first aspect of the present invention provides a method for constrained navigation in a three dimensional (3D) virtual arena, comprising: creating a guide for navigating a camera about the 3D virtual arena by defining a set of parameters to define a series of ellipses around a surface area associated with the 3D virtual arena, the set of parameters comprising a start Y value; determining a default position for the camera by calculating a start X value and a start Z value for the series of ellipses; and positioning the camera at the default position using the start X value, the start Y value and the start Z value.

A second aspect of the present invention provides a system for constrained navigation in a three dimensional (3D) virtual arena, comprising: a module for creating a guide for navigating a camera about the 3D virtual arena by defining a set of parameters to define a series of ellipses around a surface area associated with the 3D virtual arena, the set of parameters comprising a start Y value; a module for determining a default position for the camera by calculating a start X value and a start Z value for the series of ellipses; and a module for positioning the camera at the default position using the start X value, the start Y value and the start Z value.

A third aspect of the present invention provides a program product stored on a computer readable medium for constrained navigation in a three dimensional (3D) virtual arena, the computer readable medium comprising program code for causing a computer system to: create a guide for navigating a camera about the 3D virtual arena by defining a set of parameters to define a series of ellipses around a surface area associated with the 3D virtual arena, the set of parameters comprising a start Y value; determine a default position for the camera by calculating a start X value and a start Z value for the series of ellipses; and position the camera at the default position using the start X value, the start Y value and the start Z value.

A fourth aspect of the present invention provides a method for deploying a system for constrained navigation in a three dimensional (3D) virtual arena, comprising: deploying a computer infrastructure being operable to: create a guide for navigating a camera about the 3D virtual arena by defining a set of parameters to define a series of ellipses around a surface area associated with the 3D virtual arena, the set of parameters comprising a start Y value; determine a default position for the camera by calculating a start X value and a start Z value for the series of ellipses; and position the camera at the default position using the start X value, the start Y value and the start Z value.

A fifth aspect of the present invention provides computer software embodied in a propagated signal for constrained navigation in a three dimensional (3D) virtual arena, the computer software comprising instructions for causing a computer system to: create a guide for navigating a camera about the 3D virtual arena by defining a set of parameters to define a series of ellipses around a surface area associated with the 3D virtual arena, the set of parameters comprising a start Y value; determine a default position for the camera by calculating a start X value and a start Z value for the series of ellipses; and position the camera at the default position using the start X value, the start Y value and the start Z value.

A sixth aspect of the present invention provides a data processing system for constrained navigation in a three dimensional (3D) virtual arena, comprising a memory medium having instructions; a bus coupled to the memory medium; a processor coupled to the bus that when executing the instructions causes the data processing system to: create a guide for navigating a camera about the 3D virtual arena by defining a set of parameters to define a series of ellipses around a surface area associated with the 3D virtual arena, the set of parameters comprising a start Y value; determine a default position for the camera by calculating a start X value and a start Z value for the series of ellipses; and position the camera at the default position using the start X value, the start Y value and the start Z value.

A seventh aspect of the present invention provides a computer-implemented business method for constrained navigation in a three dimensional (3D) virtual arena, comprising: creating a guide for navigating a camera about the 3D virtual arena by defining a set of parameters to define a series of ellipses around a surface area associated with the 3D virtual arena, the set of parameters comprising a start Y value; determining a default position for the camera by calculating a start X value and a start Z value for the series of ellipses; and positioning the camera at the default position using the start X value, the start Y value and the start Z value.

BRIEF DESCRIPTION OF THE DRAWINGS

These and other features of this invention will be more readily understood from the following detailed description of the various aspects of the invention taken in conjunction with the accompanying drawings in which.

Figure 1:
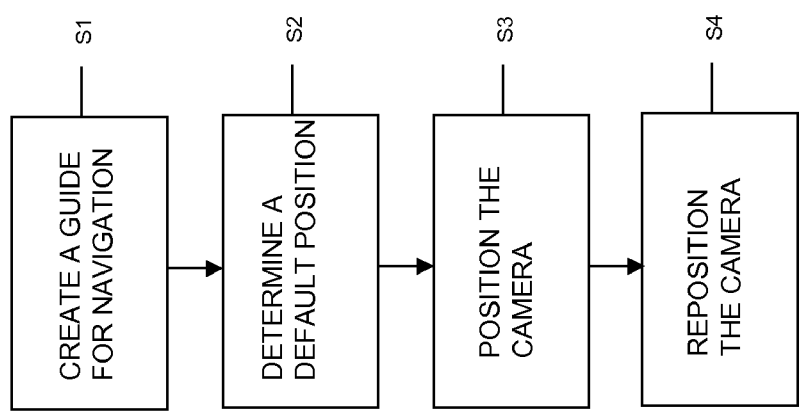
FIG. 1 depicts a method flow diagram according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the detailed description of the invention has the following sections:
I. General Description
II. Computerized Implementation
I. General Description As indicated above, this disclosure describes a method for navigation (of a camera) that solves many of these issues for an enclosed 3D environment (e.g., the inside of a sports stadium or arena). The navigation system created constrains the user view (camera) to a (pre-defined) guide based on the shape and size of the interior area which is the focus of the 3D virtual world. In the case of an arena this would generally be the playing surface. The user can easily control the camera movement on this guide with traditional up/down and left/right controls. These controls could be implemented as buttons within the application, keyboard controls, or mouse controls.

Along these lines, the present invention teaches the creation of a guide that allows a user to move the camera and change views while maintaining focus on the inside of the space defined by the guide. The guide can be thought of as the surface of a half-sphere. The camera moves left, right, up, and down while remaining on the surface and refocusing on the center point after each movement. The present invention also easily accommodates other preset camera positions and views outside the guide. With the description herein, a user could easily navigate to these preset views through button controls and then return to their previous position on the guide.

One advantage to using this type of constrained navigation is that it allows a simpler 2D control interface for users. Additionally, as long as the guide does not intersect with any other object in the 3D world, a constrained guide eliminates the need for the developer to account for navigating around physical obstacles in the virtual world. Under the present invention, the guide is created by moving the camera around a series of elliptical planes. These planes are defined as the camera moves. The initial parameters define the largest ellipse around which the camera will move. The algorithm presented creates smaller ellipses both above and below the start position. The advantage of this feature is that it can bring the camera view closer to the center of the surface as it moves down towards the surface, thus avoiding physical barriers such as stands and allowing a "sideline" view. The teachings described herein use a small number of basic parameters to define the ellipses and guide. These parameters can be easily changed and adapted for different sized and shaped surface areas which are the main focus of the camera view.

Referring now to FIG. 1, a description of the steps of present invention will be given in greater detail. Specifically, in step S1, a guide for navigating a camera about a 3D virtual arena is first created by defining a set (at least one) of parameters to define a series of ellipses around a surface area associated with the 3D virtual arena, the set of parameters comprising a start Y value. To this extent, the set of parameters comprise at least one of the following parameters:

(1) A surface length value corresponding to a length of the surface area which is a focus of a view of the camera;

(2) A surface width value corresponding to a width of the surface area which is the focus of the view of the camera;

(3) A major axis value comprising: (a multiplier*the surface length value), the major axis value corresponding to a major axis of a largest of the set of ellipses around the surface area;

(4) A minor axis value comprising: (the multiplier*the surface width value), the minor axis value corresponding to a minor axis of a largest of the set of ellipses around the surface area;

(5) A degree of rotation value corresponding to rotation around an ellipse for the default position;

(6) A start Y value corresponding to a height for the default position;

(7) A maximum height value corresponding to a maximum height of the camera;

(8) A minimum height value corresponding to a minimum height of the camera;

(9) An elevation increment value corresponding to a change in height of the camera from the default position;

(10) A rotation increment value corresponding to a change in degrees that the camera moves around the set of ellipses for each discrete movement;

(11) An elevation step value comprising: (maximum height value/the elevation increment value) the elevation step value corresponding to a quantity of discrete ellipses that exist between the surface area and the maximum height of the camera;

(12) An elevation major increment value comprising: (the major axis value/the elevation step value), the elevation major increment value corresponding to a change in axis for each elevation increment value; and/OR

(13) An elevation minor increment value comprising: (the minor axis value/the elevation step value), the elevation minor increment value also corresponding to a change in axis for each elevation increment value.

Figure 2A:
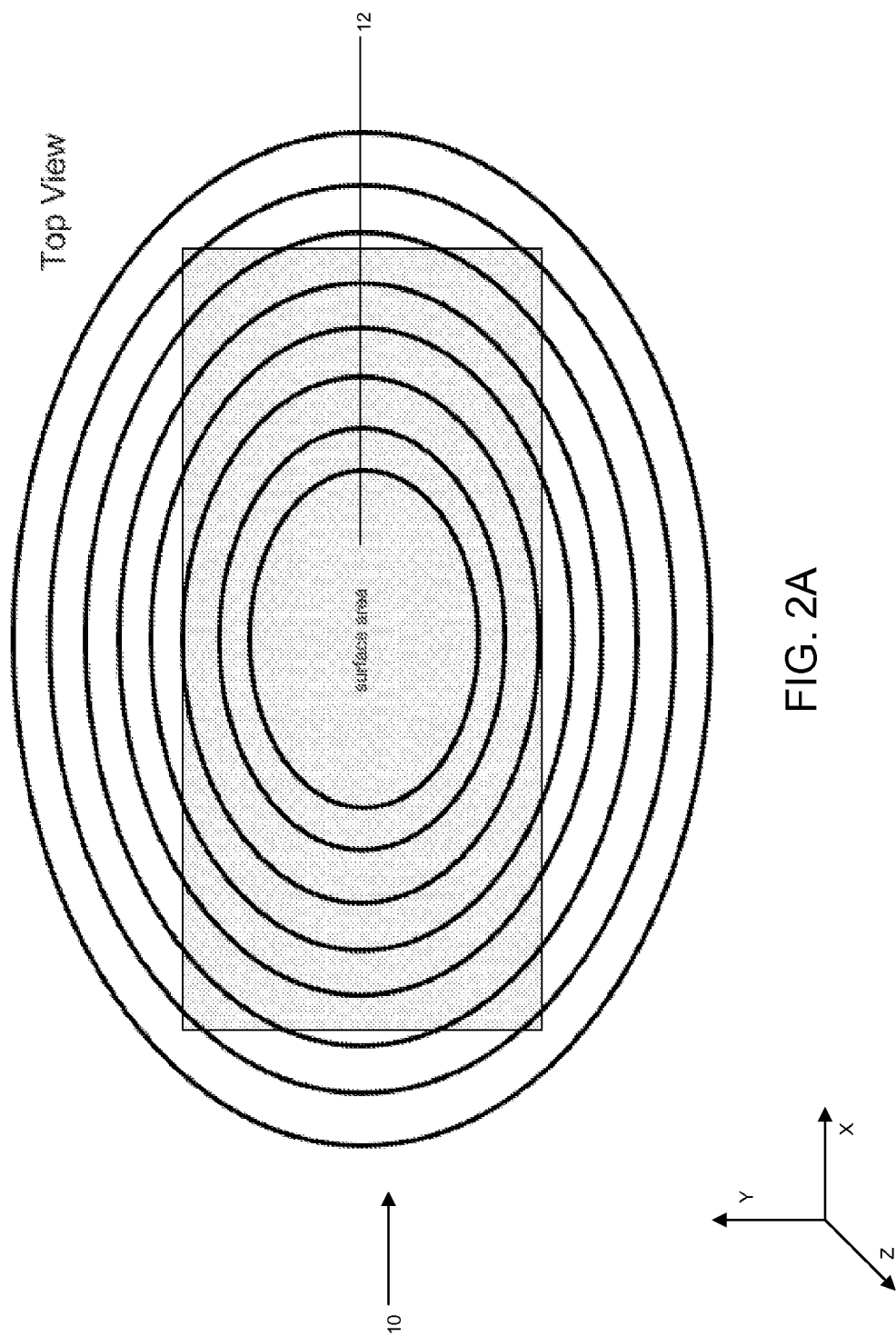
FIG. 2A depicts a top view of a set of ellipses that define a navigation guide according to the present invention.
Figure 2B:
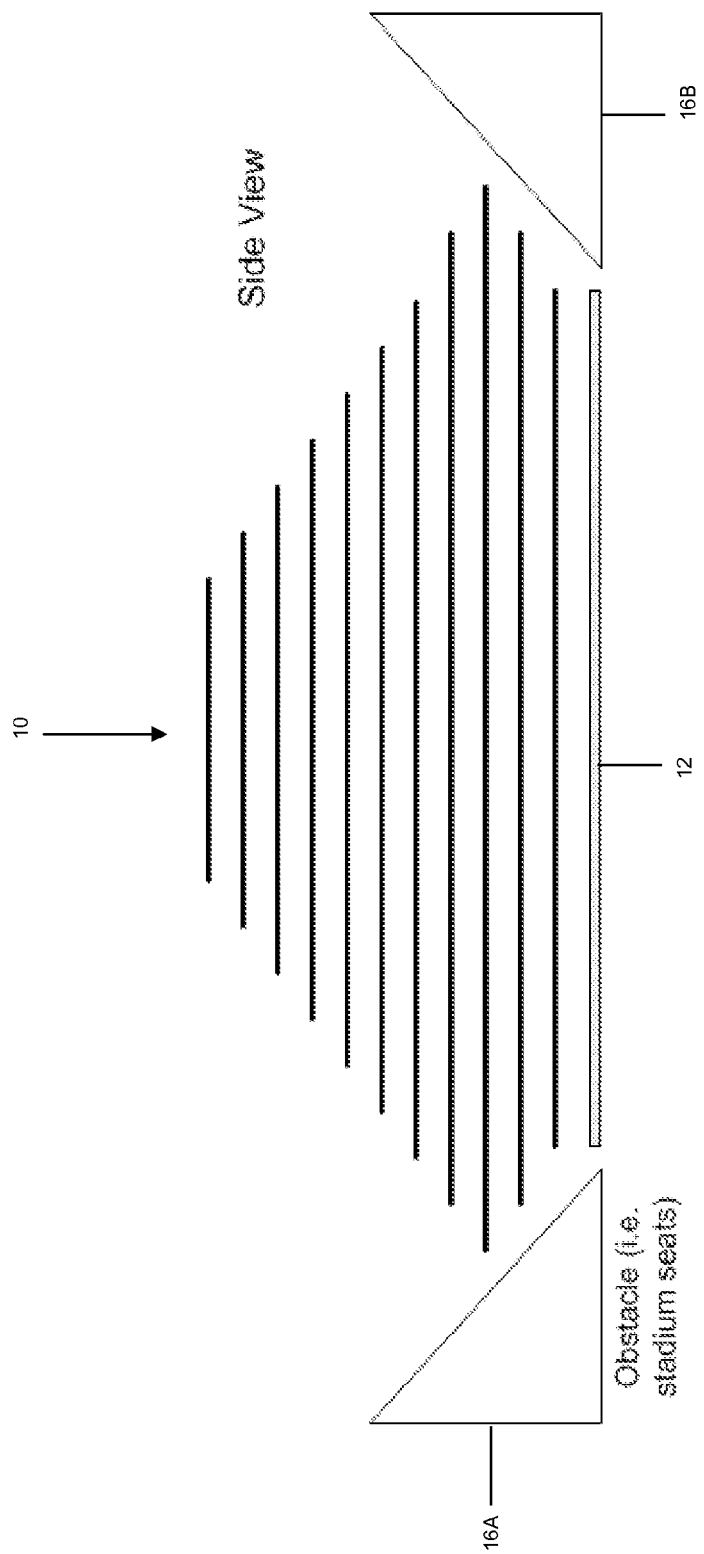
FIG. 2B depicts a side view of a set of ellipses that define a navigation guide according to the present invention.

A top view of an illustrative series of ellipses 10 is shown in FIG. 2A. As can been seen, series of ellipses are defined around a surface area 12 (e.g., a playing surface) of a 3D virtual arena (e.g., a stadium). A side view of series of ellipses 10 is shown in FIG. 2B. As can be seen, series of ellipses are defined over and around surface area 12, but around obstructions 16A-B (e.g., stadium seats). In general, the present invention allows for camera movement along an X-axis (left-right), along a Y-axis (up-down) and/or along a Z-axis (in-out).

Referring back to FIG. 1, in step S2, a default position for the camera is determined by calculating a start X value and a start Z value for the series of ellipses. In step S3, the camera is positioned at the default position using the start X value, the start Y value and the start Z value. Thereafter, in step S4, the camera can be repositioned based on a user navigation (of at least one discrete movements) along the guide. The discrete movement(s) that controls the execution of this algorithm can come from a number of different sources and can be defined in a number of ways. A discrete movement could be one keyboard click, one mouse click, "M" movements per second while a key or mouse button is depressed, etc.

Regardless, in one example, assume that the user navigation comprises a discrete movement along an X-axis. When this happens, the following algorithm is followed and some new values are changed/calculated. Specifically, a degree of rotation value is changed (increased or decreased) by rotation increment value based on the discrete movement; Radians from the degree of rotation value is calculated after the change; a new start X value is calculated on a elliptical plane associated with series of ellipses; and a new start Z value is calculated on the elliptical plane. In a typical embodiment, the new start X value is calculated using the function (minor axis value)*cos(Radians), and the new start Z value being calculated using the function: (major axis value)*cos(Radians). Regardless, based on these change(s)/calculation(s), the camera is repositioned using the new start X value and the new start Z value and then pointed towards a center of the surface area.

In another example, assume that the user navigation comprises a discrete movement along a Y-axis. When this occurs, the following algorithm is followed: if a current camera Y value is above the start Y value, a negative multiplier is created; if the current camera Y value is below the start Y value, a positive multiplier is created; if the current camera Y value is equal to the start Y value, the major axis value and the minor axis value are reset to original values; a temporary Y value is obtained that is an elevation increment value above or below a current Y position based on movement along the Y-axis; if the temporary Y value is less than a maximum height value and more than a minimum height value, the major axis value and the minor axis value are updated by: (the major axis value+(the elevation increment value*a multiplier*a direction value)), where a direction of the movement is considered negative for downward movement and positive for upward movement; the current camera Y value is set to the temporary Y value and a new X value and a new Z value are calculated based on the new axes; and the camera is repositioned accordingly.

II. Computerized Implementation

Figure 3:
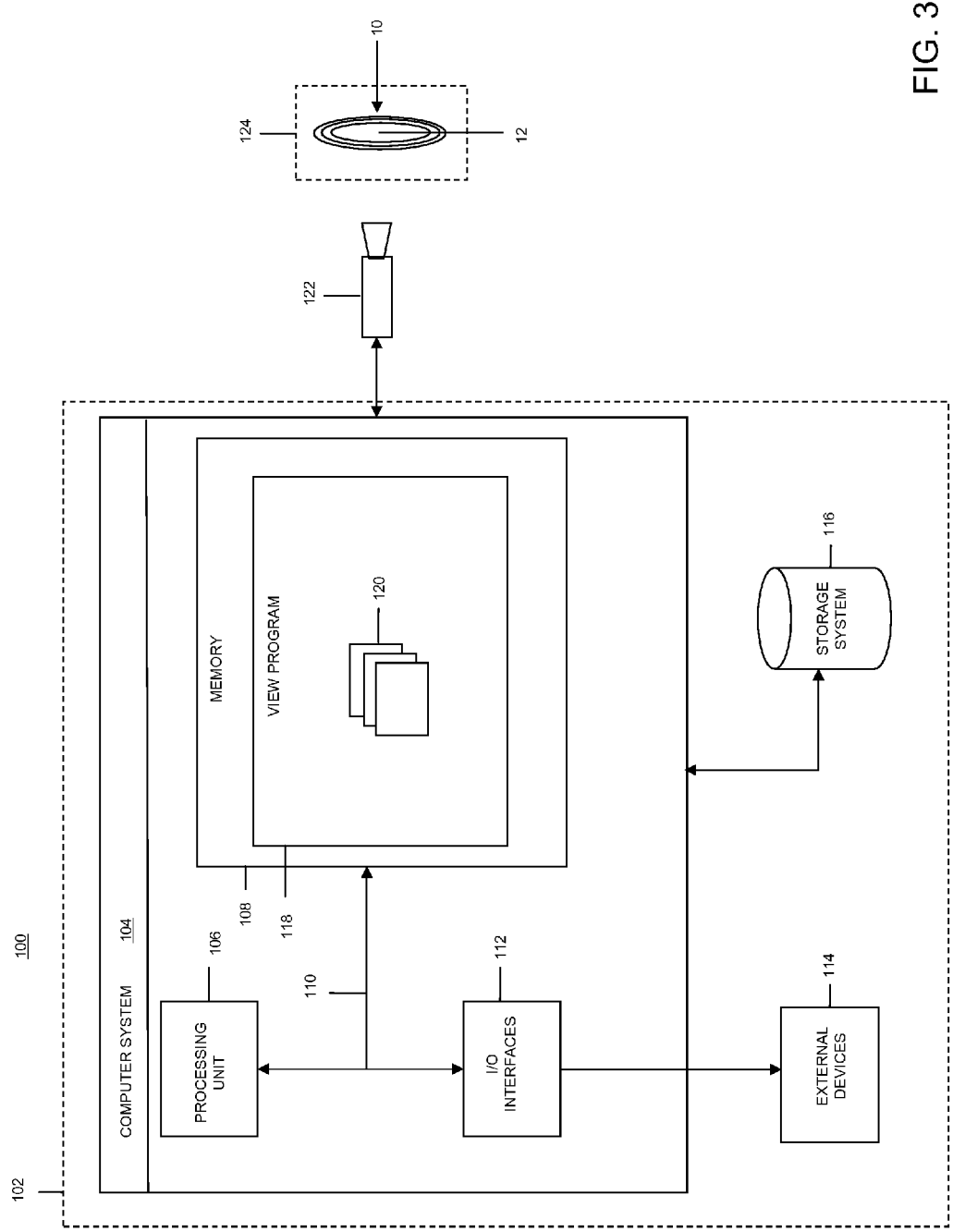
FIG. 3 depicts a system for constrained navigation in a 3D virtual arena according to the present invention.

Referring now to FIG. 3, a computerized implementation 100 of the present invention is shown. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc. by a service provider who offers to implement, deploy, and/or perform the functions of the present invention for others.

As shown, computer system 104 includes a processing unit 106, a memory 108, a bus 110, and input/output (I/O) interfaces 112. Further, computer system 104 is shown in communication with external I/O devices/resources 114 and storage system 116. In general, processing unit 106 executes computer program code, such as view program 118, which is stored in memory 108 and/or storage system 116. While executing computer program code, processing unit 106 can read and/or write data to/from memory 108, storage system 116, and/or I/O interfaces 112. Bus 110 provides a communication link between each of the components in computer system 104. External devices 114 can comprise any devices (e.g., keyboard, pointing device, display, etc.) that enable a user to interact with computer system 104 and/or any devices (e.g., network card, modem, etc.) that enable computer system 104 to communicate with one or more other computing devices.

Computer infrastructure 102 is only illustrative of various types of computer infrastructures for implementing the invention. For example, in one embodiment, computer infrastructure 102 comprises two or more computing devices (e.g., a server cluster) that communicate over a network to perform the various process of the invention. Moreover, computer system 104 is only representative of various possible computer systems that can include numerous combinations of hardware. To this extent, in other embodiments, computer system 104 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, processing unit 106 may comprise a single processing unit, or be distributed across one or more processing units in one or more locations, e.g., on a client and server. Similarly, memory 108 and/or storage system 116 can comprise any combination of various types of data storage and/or transmission media that reside at one or more physical locations. Further, I/O interfaces 112 can comprise any module for exchanging information with one or more external device 114. Still further, it is understood that one or more additional components (e.g., system software, math co-processing unit, etc.) not shown in FIG. 3 can be included in computer system 104. However, if computer system 104 comprises a handheld device or the like, it is understood that one or more external devices 114 (e.g., a display) and/or storage system 116 could be contained within computer system 104, not externally as shown.

Storage system 116 can be any type of system capable of providing storage for information under the present invention. To this extent, storage system 116 could include one or more storage devices, such as a magnetic disk drive or an optical disk drive. In another embodiment, storage system 116 includes data distributed across, for example, a local area network (LAN), wide area network (WAN) or a storage area network (SAN) (not shown). In addition, although not shown, additional components, such as cache memory, communication systems, system software, etc., may be incorporated into computer system 104.

Shown in memory 108 of computer system 104 is view program 118, which a set (at least one) of modules 120. The modules generally provide the functions of the present invention as described herein. Specifically (among other things), set of modules 120 is configured to create a guide for navigating a camera about the 3D virtual arena by defining the above-described set of parameters to define series of ellipses 10 around surface area 12 associated with 3D virtual arena 124, the set of parameters; determine a default position for camera 122 by calculating a start X value and a start Z value for series of ellipses 10; position camera 122 at the default position using the start X value, the start Y value and the start Z value; and/or reposition camera 122 based on a user navigation along the guide.

In repositioning camera 122, set of modules 120 is configured to reposition camera 122 in response to a user navigation/discrete movement along an X-axis. Specifically, set of modules 120 is configured to: change a degree of rotation value by rotation increment value based on the discrete movement; calculate Radians from the degree of rotation value after the change; calculate a new start X value on a elliptical plane associated with series of ellipses; calculate a new start Z value on the elliptical plane; and/or reposition the camera using the new start X value and the new start Z value, and point the camera towards a center of the surface area. As mentioned above, the new start X value is calculated using the function (minor axis value)*cos(Radians), and the new start Z value is calculated using the function: (major axis value)*cos(Radians).

Further, in repositioning camera 122, set of modules 120 is configured to reposition camera 122 in response to a user navigation/discrete movement along a Y-axis. Specifically, set of modules 120 is configured to: if a current camera Y value is above the start Y value, create a negative multiplier; if the current camera Y value is below the start Y value, create a positive multiplier; if the current camera Y value is equal to the start Y value, reset the major axis value and the minor axis value to original values; obtain a temporary Y value that is an elevation increment value above or below a current Y position based on movement along the Y-axis; if the temporary Y value is less than a maximum height value and more than a minimum height value, update the major axis value and the minor axis value by: (the major axis value+(the elevation increment value*a multiplier*a direction value)), where a direction of the movement is considered negative for downward movement and positive for upward movement; set the current camera Y value to the temporary Y value and calculate a new X value and a new Z value based on new axes; and reposition the camera.

While shown and described herein as a method, system, and program product for constrained navigation in a 3D virtual arena, it is understood that the invention further provides various alternative embodiments. For example, in one embodiment, the invention provides a computer-readable/useable medium that includes computer program code to enable a computer infrastructure to provide constrained navigation in a 3D virtual arena. To this extent, the computer-readable/useable medium includes program code that implements each of the various process of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 108 (FIG. 3) and/or storage system 116 (FIG. 3) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to provide constrained navigation in a 3D virtual arena. In this case, the service provider can create, maintain, support, etc., a computer infrastructure, such as computer infrastructure 102 (FIG. 3) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for constrained navigation in a 3D virtual arena. In this case, a computer infrastructure, such as computer infrastructure 102 (FIG. 3), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 104 (FIG. 3), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for constrained navigation in a three dimensional (3D) virtual arena, comprising:
creating a guide for navigating a camera about the 3D virtual arena by defining a set of parameters to define a series of virtual ellipses solely within which the camera is contained around a surface area associated with the 3D virtual arena based on dimensions of the surface area, the set of parameters comprising a start Y value;

determining a default position for the camera by calculating a start X value and a start Z value for the series of ellipses; and positioning the camera at the default position using the start X value, the start Y value and the start Z value, wherein the set of parameters further comprise:

a surface length value corresponding to a length of the surface area which is a focus of a view of the camera;

a surface width value corresponding to a width of the surface area which is the focus of the view of the camera;

a major axis value comprising: (a multiplier*the surface length value), the major axis value corresponding to a major axis of a largest of the set of ellipses around the surface area;

a minor axis value comprising: (the multiplier*the surface width value), the minor axis value corresponding to a minor axis of a largest of the set of ellipses around the surface area;

a degree of rotation value corresponding to rotation around an ellipse for the default position;

the start Y value, the start Y value corresponding to a height for the default position;

a maximum height value corresponding to a maximum height of the camera;

a minimum height value corresponding to a minimum height of the camera;

an elevation increment value corresponding to a change in height of the camera from the default position;

a rotation increment value corresponding to a change in degrees that the camera moves around the set of ellipses for each discrete movement;

an elevation step value comprising: (maximum height value/the elevation increment value) the elevation step value corresponding to a quantity of discrete ellipses that exist between the surface area and the maximum height of the camera;

an elevation major increment value comprising: (the major axis value/the elevation step value), the elevation major increment value corresponding to a change in axis for each elevation increment value; and an elevation minor increment value comprising: (the minor axis value/the elevation step value), the elevation minor increment value also corresponding to a change in axis for each elevation increment value.

2. The method of claim 1, further comprising repositioning the camera within the 3D virtual arena based on a user navigation using a 2D control interface by moving the camera along a path defined by the series of ellipses in the guide.

3. The method of claim 2, the user navigation comprising a discrete movement along an X-axis.

4. The method of claim 3, further comprising:

changing a degree of rotation value by rotation increment value based on the discrete movement;

calculating Radians from the degree of rotation value after the changing;

calculating a new start X value on a elliptical plane associated with series of ellipses;

calculating a new start Z value on the elliptical plane; and the repositioning comprising:

repositioning the camera using the new start X value and the new start Z value, and pointing the camera towards a center of the surface area.

5. The method of claim 4, the new start X value being calculated using the function (minor axis value)*cos(Radians), and the new start Z value being calculated using the function: (major axis value)*cos(Radians).

6. The method of claim 2, the user navigation comprising a discrete movement along a Y-axis.

7. The method of claim 6, further comprising:

if a current camera Y value is above the start Y value, creating a negative multiplier;

if the current camera Y value is below the start Y value, creating a positive multiplier;

if the current camera Y value is equal to the start Y value, resetting a major axis value and a minor axis value to original values;

obtaining a temporary Y value that is an elevation increment value above or below a current Y position based on movement along the Y-axis;

if the temporary Y value is less than a maximum height value and more than a minimum height value, updating the major axis value and the minor axis value by: (the major axis value+(the elevation increment value*a multiplier*a direction value)), where a direction of the movement is considered negative for downward movement and positive for upward movement;

setting the current camera Y value to the temporary Y value and calculating a new X value and a new Z value based on new axes; and repositioning the camera.

8. A system for constrained navigation in a three dimensional (3D) virtual arena, comprising:

a module for creating a guide for navigating a camera about the 3D virtual arena by defining a set of parameters to define a series of virtual ellipses solely within which the camera is contained around a surface area associated with the 3D virtual arena based on dimensions of the surface area, the set of parameters comprising a start Y value;

a module for determining a default position for the camera by calculating a start X value and a start Z value for the series of ellipses; and a module for positioning the camera at the default position using the start X value, the start Y value and the start Z value, wherein the set of parameters further comprise:

a surface length value corresponding to a length of the surface area which is a focus of a view of the camera;

a surface width value corresponding to a width of the surface area which is the focus of the view of the camera;

a major axis value comprising: (a multiplier*the surface length value), the major axis value corresponding to a major axis of a largest of the set of ellipses around the surface area a minor axis value comprising: (the multiplier*the surface width value), the minor axis value corresponding to a minor axis of a largest of the set of ellipses around the surface area;

a degree of rotation value corresponding to rotation around an ellipse for the default position;

the start Y value, the start Y value corresponding to a height for the default position;

a maximum height value corresponding to a maximum height of the camera;

a minimum height value corresponding to a minimum height of the camera;

an elevation increment value corresponding to a change in height of the camera from the default position;

a rotation increment value corresponding to a change in degrees that the camera moves around the set of ellipses for each discrete movement;

an elevation step value comprising: (maximum height value/the elevation increment value) the elevation step value corresponding to a quantity of discrete ellipses that exist between the surface area and the maximum height of the camera;

an elevation major increment value comprising: (the major axis value/the elevation step value), the elevation major increment value corresponding to a change in axis for each elevation increment value; and an elevation minor increment value comprising: (the minor axis value/the elevation step value), the elevation minor increment value also corresponding to a change in axis for each elevation increment value.

9. The system of claim 8, a module for repositioning the camera within the 3D virtual arena based on a user navigation using a 2D control interface by moving the camera along a path defined by the series of ellipses in the guide.

10. The system of claim 9, the user navigation comprising a discrete movement along an X-axis.

11. The system of claim 10, the module for repositioning being configured to:

change a degree of rotation value by rotation increment value based on the discrete movement;

calculate Radians from the degree of rotation value after the change;

calculate a new start X value on a elliptical plane associated with series of ellipses;

calculate a new start Z value on the elliptical plane;

reposition the camera using the new start X value and the new start Z value, and point the camera towards a center of the surface area.

12. The system of claim 11, the new start X value being calculated using the function (minor axis value)*cos(Radians), and the new start Z value being calculated using the function: (major axis value)*cos(Radians).

13. The system of claim 9, the user navigation comprising a discrete movement along a Y-axis.

14. The system of claim 13, the module for repositioning being configured to:

if a current camera Y value is above the start Y value, create a negative multiplier;

if the current camera Y value is below the start Y value, create a positive multiplier;

if the current camera Y value is equal to the start Y value, reset a major axis value and a minor axis value to original values;

obtain a temporary Y value that is an elevation increment value above or below a current Y position based on movement along the Y-axis;

if the temporary Y value is less than a maximum height value and more than a minimum height value, update the major axis value and the minor axis value by: (the major axis value+(the elevation increment value*a multiplier*a direction value)), where a direction of the movement is considered negative for downward movement and positive for upward movement;

set the current camera Y value to the temporary Y value and calculate a new X value and a new Z value based on new axes; and reposition the camera.

15. A program product stored on a non-transitory computer readable storage medium for constrained navigation in a three dimensional (3D) virtual arena, the computer readable medium comprising program code for causing a computer system to:

create a guide for navigating a camera about the 3D virtual arena by defining a set of parameters to define a series of virtual ellipses solely within which the camera is contained around a surface area associated with the 3D virtual arena based on dimensions of the surface area, the set of parameters comprising a start Y value;

determine a default position for the camera by calculating a start X value and a start Z value for the series of ellipses; and position the camera at the default position using the start X value, the start Y value and the start Z value, wherein the set of parameters further comprise:

a surface length value corresponding to a length of the surface area which is a focus of a view of the camera;

a surface width value corresponding to a width of the surface area which is the focus of the view of the camera;

a major axis value comprising: (a multiplier*the surface length value), the major axis value corresponding to a major axis of a largest of the set of ellipses around the surface area;

a minor axis value comprising: (the multiplier*the surface width value), the minor axis value corresponding to a minor axis of a largest of the set of ellipses around the surface area;

a degree of rotation value corresponding to rotation around an ellipse for the default position;

the start Y value, the start Y value corresponding to a height for the default position;

a maximum height value corresponding to a maximum height of the camera; a minimum height value corresponding to a minimum height of the camera;

an elevation increment value corresponding to a change in height of the camera from the default position;

a rotation increment value corresponding to a change in degrees that the camera moves around the set of ellipses for each discrete movement;

an elevation step value comprising: (maximum height value/the elevation increment value) the elevation step value corresponding to a quantity of discrete ellipses that exist between the surface area and the maximum height of the camera;

an elevation major increment value comprising: (the major axis value/the elevation step value), the elevation major increment value corresponding to a change in axis for each elevation increment value; and an elevation minor increment value comprising: (the minor axis value/the elevation step value), the elevation minor increment value also corresponding to a change in axis for each elevation increment value.

16. The program product of claim 15, the computer readable medium further comprising program code for causing the computer system to reposition the camera within the 3D virtual arena based on a user navigation using a 2D control interface by moving the camera along a path defined by the series of ellipses in the guide.

17. The program product of claim 16, the user navigation comprising a discrete movement along an X-axis.

18. The program product of claim 17, the computer readable medium further comprising program code for causing the computer system to:

change a degree of rotation value by rotation increment value based on the discrete movement;

calculate Radians from the degree of rotation value after the change;

calculate a new start X value on a elliptical plane associated with series of ellipses;

calculate a new start Z value on the elliptical plane;

reposition the camera using the new start X value and the new start Z value, and point the camera towards a center of the surface area.

19. The program product of claim 18, the new start X value being calculated using the function (minor axis value)*cos(Radians), and the new start Z value being calculated using the function: (major axis value)*cos(Radians).

20. The program product of claim 16, the user navigation comprising a discrete movement along a Y-axis.

21. The program product of claim 20, the computer readable medium further comprising program code for causing the computer system to:

if a current camera Y value is above the start Y value, create a negative multiplier;

if the current camera Y value is below the start Y value, create a positive multiplier;

if the current camera Y value is equal to the start Y value, reset a major axis value and a minor axis value to original values;

obtain a temporary Y value that is an elevation increment value above or below a current Y position based on movement along the Y-axis;

if the temporary Y value is less than a maximum height value and more than a minimum height value, update the major axis value and the minor axis value by: (the major axis value+(the elevation increment value*a multiplier*a direction value)), where a direction of the movement is considered negative for downward movement and positive for upward movement;

set the current camera Y value to the temporary Y value and calculate a new X value and a new Z value based on new axes; and reposition the camera.

22. A method for deploying a system for constrained navigation in a three dimensional (3D) virtual arena, comprising:

deploying a computer infrastructure being operable to:

create a guide for navigating a camera about the 3D virtual arena by defining a set of parameters to define a series of virtual ellipses solely within which the camera is contained around a surface area associated with the 3D virtual arena based on dimensions of the surface area, the set of parameters comprising a start Y value;

determine a default position for the camera by calculating a start X value and a start Z value for the series of ellipses; and position the camera at the default position using the start X value, the start Y value and the start Z value, wherein the set of parameters further comprise:

a surface length value corresponding to a length of the surface area which is a focus of a view of the camera;

a surface width value corresponding to a width of the surface area which is the focus of the view of the camera;

a major axis value comprising: (a multiplier*the surface length value), the major axis value corresponding to a major axis of a largest of the set of ellipses around the surface area;

a minor axis value comprising: (the multiplier*the surface width value), the minor axis value corresponding to a minor axis of a largest of the set of ellipses around the surface area;

a degree of rotation value corresponding to rotation around an ellipse for the default position;

the start Y value, the start Y value corresponding to a height for the default position;

a maximum height value corresponding to a maximum height of the camera;

a minimum height value corresponding to a minimum height of the camera;

an elevation increment value corresponding to a change in height of the camera from the default position;

a rotation increment value corresponding to a change in degrees that the camera moves around the set of ellipses for each discrete movement;

an elevation step value comprising: (maximum height value/the elevation increment value) the elevation step value corresponding to a quantity of discrete ellipses that exist between the surface area and the maximum height of the camera;

an elevation major increment value comprising: (the major axis value/the elevation step value), the elevation major increment value corresponding to a change in axis for each elevation increment value; and an elevation minor increment value comprising: (the minor axis value/the elevation step value), the elevation minor increment value also corresponding to a change in axis for each elevation increment value.

* * * * *